Feb. 28, 1956  E. W. WORK  2,736,563

DOUBLE-ACTING CHUCK

Filed Aug. 27, 1952

INVENTOR
*Erich W. Work*
BY
*Mitchell Bechert*
ATTORNEYS

United States Patent Office 2,736,563
Patented Feb. 28, 1956

2,736,563

DOUBLE-ACTING CHUCK

Erich W. Work, New Britain, Conn., assignor to Union Manufacturing Company, New Britain, Conn., a corporation of Connecticut Application August 27, 1952, Serial No. 306,673

13 Claims. (Cl. 279—121)

My invention relates to a chuck.

In ordinary chucks, the jaws are usually arranged so that the chucking pressures on the work piece are all radially inwardly or all radially outwardly. Work pieces of relatively thin section, for example light tubing, have so little resistance to distortion that it is very difficult to chuck such pieces with sufficient force to permit machining or like operations thereon. There are many work pieces that require machining or other operations, which have generally axially extending projections, or even a generally axially extending circumferential wall, which might correspond in shape and size to a short section of a tube, and by ordinary chucking methods it would be difficult or impossible to chuck such a piece by the projections or wall without serious distortion or ruin of the piece.

It is an object of my invention, therefore, to provide an improved chuck for chucking work pieces, without danger of seriously distorting the work pieces.

It is another object to provide an improved double-acting chuck in which chuck jaws are arranged in pairs circularly about the chuck body, the jaws of each pair being arranged for simultaneously engaging inner and outer surfaces of a work piece.

It is a further object to provide a chuck having jaws in pairs, so as to grip work pieces, and so arranged that corresponding jaws of each pair may be moved first so as to engage the work piece, and thereafter opposed jaws of the pairs are moved so as to engage and chuck the work piece.

Another object is to provide an improved double-acting chuck having pairs of jaws arranged circularly about the body of the chuck, together with means for moving corresponding jaws of all pairs in one direction to lightly engage the work piece, and thereafter moving the other corresponding jaws of each pair in the opposite direction to engage the work piece, after which relatively heavy pressures may be applied to all chuck jaws for gripping of the work piece and without substantial distortion thereof.

It is another object of the invention to provide an improved chuck having pairs of chuck jaws, together with actuating means including a pair of pistons concentrically arranged so as to provide a disc piston and an annular piston, and connections from such pistons to such chuck jaws, whereby the annular piston actuates all of the corresponding jaws of the pairs of jaws, and the disc piston actuates the other jaws of said pairs of jaws.

It is still another object to provide a chuck of the character indicated having pairs of jaws actuated by wedging means arranged at holding angles whereby the jaws may be set up on a work piece by an actuating force and which will remain set up on the work piece after relaxation of such force.

Other objects and various features of invention will be hereinafter pointed out or will become apparent to those skilled in the art.

In the drawings which show, for illustrative purposes only, a preferred form of the invention—

Figure 1:
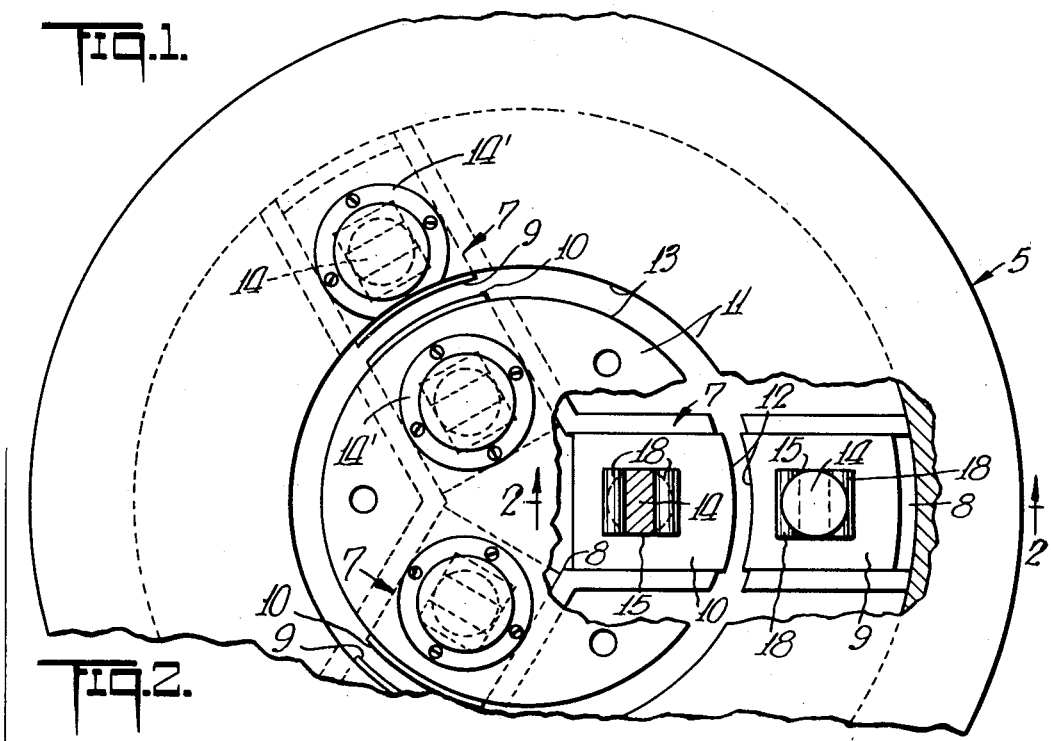
Fig. 1 is a fragmentary, generally axial view of a chuck illustrative of the invention, parts being broken away for the sake of illustration.

Briefly stated, a preferred form of the invention includes a chuck body, which is arranged to be secured to a spindle, so that the chuck body and associated parts may be rotated for machining or other operations on a work piece. The chuck has a plurality of pairs of jaws, the jaws of each pair being positioned and actuated so as to cooperate with each other for gripping a work piece. The jaws of each pair are preferably arranged opposite each other so as to engage inner and outer surfaces of a work piece simultaneously, and the jaws of each pair are preferably moved in radial directions. The jaws may be moved by various means but preferably by pressure fluid actuated means and actuating means cooperating with the various jaws so as to move the latter by wedging means arranged at locking angles so that the jaws remain in gripping contact after the pressure fluid is released. The chucking pressures may be so regulated and balanced that distortion of thin-walled work pieces is reduced to a minimum.

In the drawings, I have illustrated a chuck including a chuck body 5, which is preferably arranged to be mounted on a spindle in any desired or usual fashion. The chuck comprises chuck jaws arranged in pairs, the jaws of each pair cooperating with each other for gripping work pieces of thin section without distorting the work pieces.

In the form shown, the chuck includes three pairs of jaws, such as the pairs 7, and the chuck body 5 is preferably provided with channels 8 of a depth and width to slidably accommodate the jaws 9—10 of the pairs. While the jaws fit in the channels relatively snugly, the channels are preferably finished with the jaws to relatively close tolerances, so that the jaws are held very securely in place and yet may be moved in the channels in both the chucking and unchucking directions with relative ease. A top plate or body part 11 is secured to the main body 5 and fits over the jaws 9—10 and serves to substantially close the channels and hold the jaws in place in the channels. The chuck jaws 9—10 have chucking faces 12—12 movable toward and away from each other, and, if desired, the jaws may have pads or false jaws secured thereto, as is common practice in this art. The cover plate 11 secured to the body 5 is provided with an opening 13 for the entry or accommodation of a work piece between the jaws, and if necessary such openings or passages 13 may constitute a single circumferential or annular opening or passage for accommodating a completely circular work piece.

Figure 2:
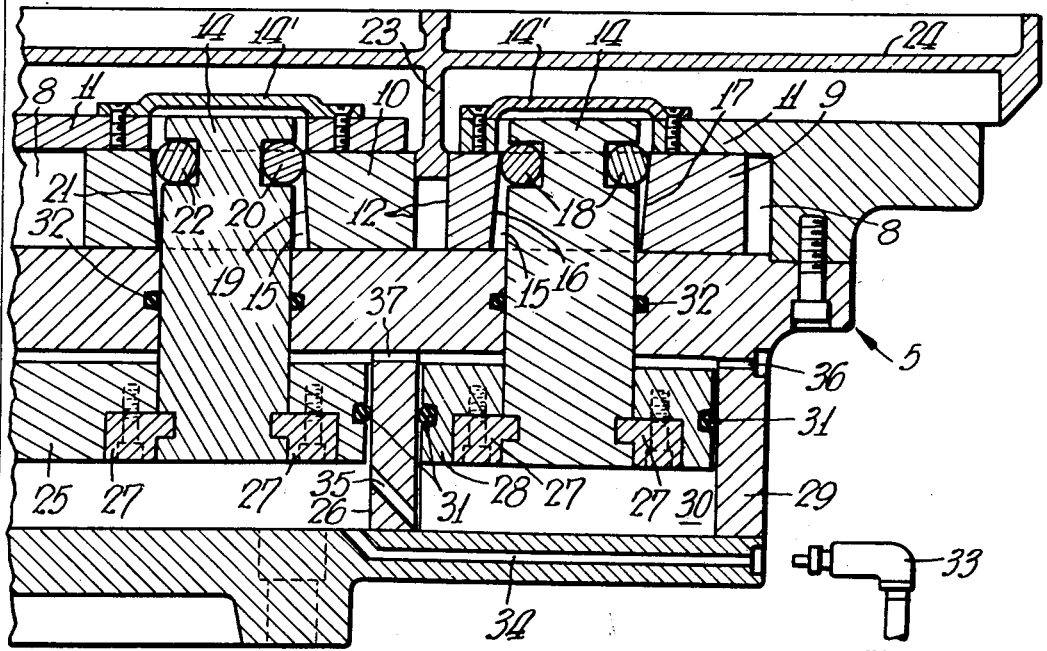
Fig. 2 is an enlarged fragmentary view in section, substantially in the plane of the line 2—2 of Fig. 1.

In the form shown, the cover plate 11 is also provided with apertures for permitting the actuators, which may be referred to as push rods 14—14, to move axially to actuate the pairs of jaws. The open tops of the apertures may be covered by caps 14' or the like. In the form illustrated, each jaw, such as 9, has an opening 15, preferably angular, for receiving an actuator or push rod 14 and such openings or passages 15 have angularly formed or inclined wedge surfaces 16 on the forward side, and 17 at the rear side, to be engaged by wedging means such as rolls or the like 18—18 carried in transverse slots in the push rods 14, as will be understood. Thus, when a push rod 14 is moved axially upwardly, as viewed in Fig. 2, the left-hand wedge or roll 18 acts along the inclined wedge surface 16 and moves the jaw 9 toward the left in chucking direction, and when the push rod 14 is moved downwardly, as viewed in Fig. 2, the other or right-hand roller 18 acts along the wedge surface 17 for retracting the jaw 9. The jaws 10 of each pair are preferably similar to the jaws 9 and each jaw 10 has a wedge surface 19 to be engaged by a roller 20, fitted in a transverse slot in its push rod 14, as will be clear. Each jaw 10 is also provided with an inclined wedge surface 21 to be engaged by a roller 22, so that when the push rod 14 is raised, as illustrated in Fig. 2, the roller 20 engaging the surface 19 moves the chuck jaw 10 to the right or radially outwardly, and when that push rod 14 is moved downwardly as viewed in Fig. 2, the roller 22 engages the wedge surface 21 for moving the jaw 10 in unchucking direction or radially inwardly. It will be seen, therefore, that when the push rods or other actuators act on the chuck jaws 9—10, the latter will be moved toward each other for chucking a part 23 of a work piece, which in the form illustrated is a generally flat plate 24 having the annular web or tubular extension 23 projecting therefrom. It will be clear that when the jaws 9—10 are arranged in pairs and directly opposite each other, and all of the jaws 10, that is, the inner jaw of each pair, are moved outwardly and the corresponding jaws 9 are moved inwardly, the tubular extension 23 may be held with great pressure and without distortion. While in the form shown, the extension 23 may be in the form of a tube, other work pieces might have merely bosses or projections less than circumferential in extent, and such extension could even be irregular in shape and irregularly spaced, in which latter case jaws would be arranged to accommodate and to grip on those parts of a work piece for which the chuck would be designed. A work piece chucked, as heretofore explained, may be machined or ground or otherwise treated, and due to facing of the jaws of each pair, sufficient force may always be applied to securely hold the work piece without danger of collapsing or expanding what may be a relatively thin projection, and which could not be gripped properly in an ordinary chuck.

The chuck jaws 9—10 may be variously actuated, but the actuating members, such as push rods 14, will move the jaws in a positive manner and are satisfactory. The push rods may be variously reciprocated, but I prefer and have illustrated piston means for actuating such push rods. In the form illustrated, all of the radially inner push rods 14, which actuate the radially inwardly positioned jaws 10, are secured to a disc piston 25, which fits in a cylinder formed by the circular wall 26 and the bottom or rear of the chuck body 5. The inner rods 14 may pass through the piston 25 and be secured thereto by means of blocks 27 secured in recesses and provided with flanges or keys fitting in transverse recesses in the rods, as will be clear. Thus, when the piston 25 moves upwardly, all of the push rods 14, which actuate inner jaws 10, will be actuated at the same time, and all of the inner jaws will be moved uniformly. In the form shown, the push rods 14, which actuate the radially outer jaws 9 of the pairs of jaws, may also be moved by piston means, and in the form illustrated, I employ an annular piston 28, which fits in an annular cylinder 30 formed by the outer chuck wall 29 and the outer wall of the cylinder 26. All of the radially outer push rods 14 for actuating the radially outer chuck jaws 9, preferably pass through the annular piston 28 and may be secured thereto by means of the blocks such as 27, heretofore described in connection with the disc piston and its push rods. The pistons 25—28 are maintained sufficiently fluid-tight in their cylinders by means of seals 31, and the push rods 14 are maintained sufficiently fluid-tight in the body wall by means of seals 32, as will be understood.

The rest of the structure and function may best be described in connection with the operation of the chuck. We may assume that the pistons 25—28 are at the bottoms of their strokes, instead of at the tops as shown, and the chuck jaws are open; the work piece 24 is put in place and air is admitted through the compressed air pipe connection 33 and air passage 34 to supply pressure fluid beneath the disc piston 25. The pressure fluid, acting beneath the piston 25, will raise the same and thus move all of the jaws 10 radially outwardly, so as to engage inner surfaces of the tubular extension 23 and center the work piece. Preferably the air pressure is such that the extension 23 will be gripped lightly, just sufficient to center and hold the work piece with no damaging distortion. When the piston 25 moves upwardly sufficiently to uncover an air passage 35 in the cylinder wall 26, pressure fluid will pass therethrough and into the cylinder 30 so that the annular piston 28 and all of the push rods 14 connected thereto will be moved up, and all of the jaws 9 will be moved radially inwardly so as to engage the tubular extension 23, and thus the extension will be gripped inside and out by jaws directly opposed to each other, and if the pistons and wedge angles are appropriately designed the chucked extension 23 will be chucked by equal pressures and without distortion. If desired, high pressure air may be admitted after the piece is chucked, if it is desired to grip the work piece with great force, and, as stated, the pressure of the two jaws acting directly opposite each other may be substantially balanced so as to hold the work piece as securely as may be required and without distorting it.

It will be seen that the slopes or angles of the wedging surfaces 16—19 on the jaws are so slight that when the jaws engage the work piece, the jaws will be frictionally locked in place and the greater the chucking pressures the more securely will the jaws be locked in place. In other words, the angles of the wedging surfaces 16—19 are locking angles and there is therefore no need to maintain air pressure beneath the pistons after a piece is chucked, and therefore the compressed air connection 33 is normally disengaged from the passage 34 after the piece is chucked and the compressed air is permitted to escape from beneath the pistons 25—28.

When it is desired to unchuck the work piece, the compressed air connection 33 is applied to the passage 36 which communicates freely with the spaces above both pistons 28—25. The passage 37 in the wall 26 between the two piston cylinders connects the latter, as will be clear. The pressure of the air above the pistons will force them down and the rollers or wedge members acting on the jaw wedge surfaces 17—21 will break the locking grip of the jaws on the work piece and move the jaws to open position so that the work piece 24 may be removed and a new work piece put in place. During the downward movement of the pistons 28—25, the air beneath the pistons may escape through the passage 34. Air beneath the annular piston 28 will not be trapped even though the piston 25 overstands the passage 35, because there is a substantial clearance between the piston 25 and the cylinder wall 26 so as to permit sufficiently rapid exhaust of the air from the annular cylinder 28.

It will be seen that I have provided a chuck which may be so constructed and arranged that work pieces of frail or easily deformed sections may be chucked with high pressures so as to hold securely, and yet the pieces need not be distorted. While all the jaws ultimately will simultaneously engage and grip the work pieces, the radially inner jaws will normally engage, center and hold the work pieces first, and later the radially outer jaws will engage and completely chuck the work pieces. This seriatim gripping by the radially inner and outer jaws is due to the fact that when the air connection 33 is applied to the passage 34, the compressed air will lift the disc portion 25 rapidly and before an appreciable pressure is built up under the annular piston 28 despite the clearance between the piston 25 and the cylinder wall 26, as described. When the disc piston has moved up so as to engage and center and lightly grip the work piece and is frictionally locked in place, the compressed air will, by leakage through the clearance space noted and the free flow through the passage 35, raise the annular piston 28 to complete the chucking of the work piece. It has already been noted that after the piece is chucked, great pressure may be applied to the work by the directly opposed jaws without danger of distorting the work piece, and the greater the chucking pressure on the work, the more securely will the jaws be frictionally locked on the work, and there is no need to maintain air pressure beneath the pistons. It may be noted that when chucking easily distorted work pieces, it is good practice to employ air pressure only sufficient to raise the disc piston 25 so as to center the work piece and hold it in place until the annular piston 28 is raised so as to complete the chucking operation. After the work piece is chucked by all the jaws, the air pressure may be increased so as to obtain any desired chucking pressure on the work and, as stated, the work piece will not be distorted.

While the invention has been illustrated in considerable detail and one preferred form shown, it is to be understood that various changes and modifications may be made within the scope of the invention as defined in the appended claims.

I claim:

1. In a chuck, a chuck body, a plurality of chuck jaws carried by said body, said jaws being arranged in pairs, a generally axially extending and movable push rod for one jaw of each pair of jaws, means connecting said push rods and jaws for moving said one of said jaws of each pair, a second generally axially extending and movable push rod for the other jaw of each of said pair of jaws, and means connecting said second generally axially extending push rods and said other jaws for moving the latter.

2. In the combination defined in claim 1, said means connecting said push rods and connected jaws comprising wedging means to move said jaws.

3. In the combination defined in claim 1, said means connecting said push rods and connected jaws comprising wedging means at locking angle to hold the jaws in chucked position.

4. In a device of the character indicated, a chuck body, a plurality of pairs of jaws slidable on said body, one jaw of each of said pairs of jaws being movable radially outwardly to engage an inner surface of a work piece to center and chuck the work piece, the other jaws of said pairs of jaws being movable inwardly to engage an outer surface of the work piece, each said jaw having a wedging surface at a locking angle with the chuck axis, and actuating means movable in a generally axial direction and engageable with said wedging surfaces to move said jaws in chucking direction and frictionally hold said jaws in locked chucking position.

5. In the combination defined in claim 4, said actuating means including push rods having parts engageable with said wedging surfaces, and a disc piston and cylinder means for moving some of said push rods and an annular piston and cylinder means for moving the others of said push rods.

6. In a chuck, a pair of jaws movable toward each other for causing one jaw to engage an inside surface of a work piece and the other jaw an outside surface of the work piece for compressing and holding the work piece between them, wedging means arranged at a holding angle for urging both of said jaws toward each other, for the purpose set forth.

7. In a chuck, a chuck body, a plurality of chuck jaws carried by said body, said jaws being arranged in pairs, each pair comprising an inside jaw and an outside jaw and positioned to simultaneously grip an inside and an outside surface of a work piece, wedging means for moving said inside jaws of all said pairs in chucking direction, and wedging means for moving all of said outside jaws in chucking direction, for the purpose set forth.

8. In the combination defined in claim 7, and means for causing all of said corresponding jaws of all of said pairs to move in chucking direction before all the said corresponding other jaws.

9. In the combination defined in claim 7, a piston and cylinder means associated with said first mentioned wedging means for actuating the latter, and a concentric piston and cylinder means associated with said second mentioned wedging means for actuating the latter.

10. In the combination defined in claim 9, said concentric piston and cylinder means comprising an annular cylinder and annular piston surrounding said first mentioned piston and cylinder means.

11. In a chuck, a chuck body, a chuck jaw movable thereon, said jaw having a pair of opposed axially inclined surfaces, a chuck actuator, means for moving the same in a generally axial direction, said actuator having surfaces to coact with said axially inclined surfaces to move said jaw back and forth upon axial reciprocation of said actuator.

12. In a chuck, a chuck body, jaw means movable on said body, a jaw actuator movable in a generally axial direction, said jaw means having axially inclined opposed wedging surfaces, said actuator having surfaces to coact with said inclined wedging surfaces to move said jaw means back and forth upon axial reciprocating movement of said actuator.

13. In a chuck, a chuck body, a plurality of chuck jaw means movable on said body, piston and cylinder means carried by said body, jaw actuators connected to and operable in an axial direction by said piston and cylinder means, said chuck jaw means having opposed axially inclined wedging surfaces and said jaw actuators having parts to engage said wedging surfaces to move said jaws back and forth upon axial reciprocation of said actuators.

References Cited in the file of this patent

UNITED STATES PATENTS

| | | |
|---|---|---|
| 566,702 | Sellers | Aug. 25, 1896 |
| 638,695 | Beeley | Dec. 12, 1899 |
| 1,053,482 | Dreier | Feb. 18, 1913 |
| 1,498,879 | Lofland | June 24, 1924 |